No. 748,566. PATENTED DEC. 29, 1903.
H. N. PIERCE.
CALCULATING INSTRUMENT.
APPLICATION FILED AUG. 28, 1902.
NO MODEL.
4 SHEETS—SHEET 1.
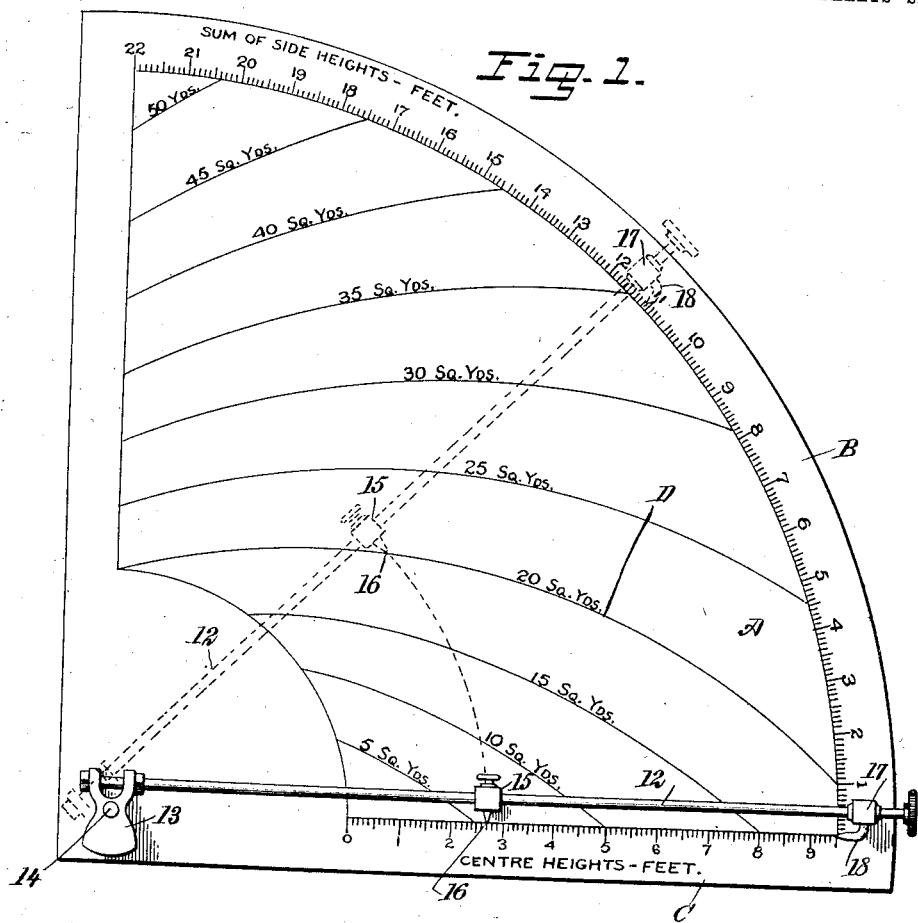
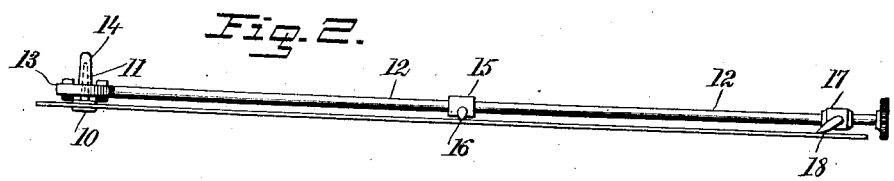
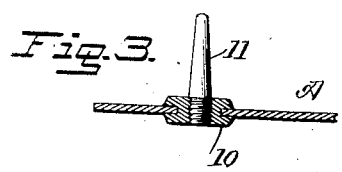
WITNESSES:
INVENTOR
Henry N. Pierce
BY 
ATTORNEYS.

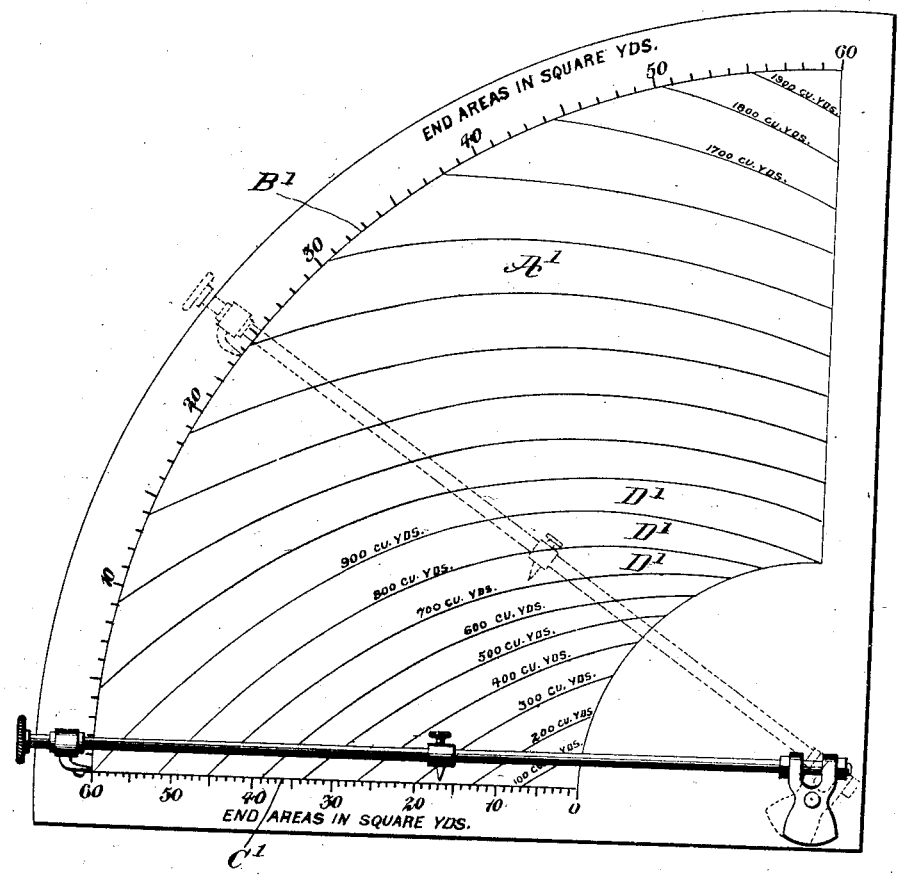

No. 748,566. PATENTED DEC. 29, 1903.
H. N. PIERCE.
CALCULATING INSTRUMENT.
APPLICATION FILED AUG. 28, 1902.
NO MODEL. 4 SHEETS—SHEET 3.
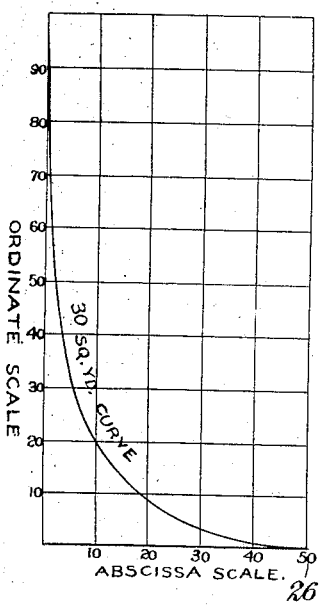
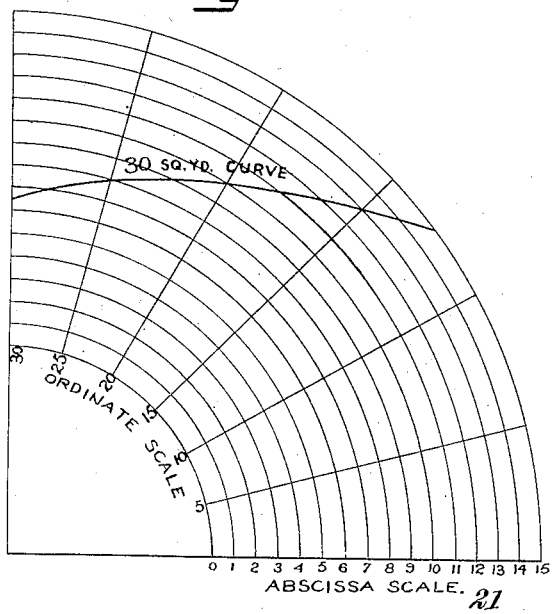
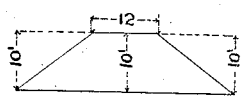
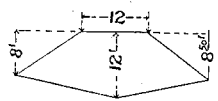
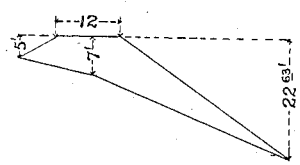
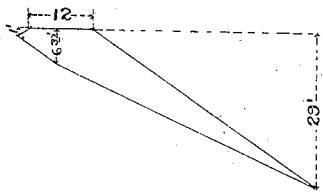
WITNESSES:
James F. Duhamel
J. Fred Acker
INVENTOR
Henry N. Pierce
BY
ATTORNEYS.

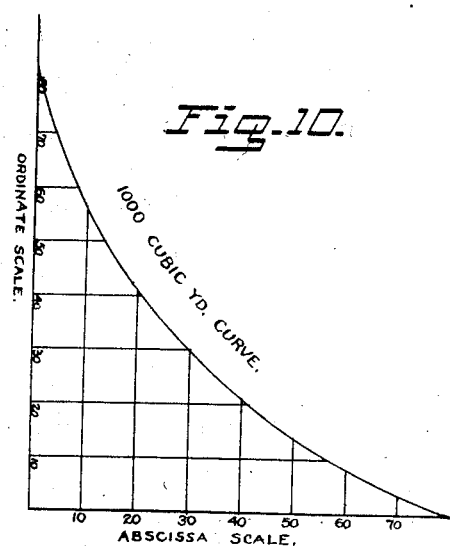
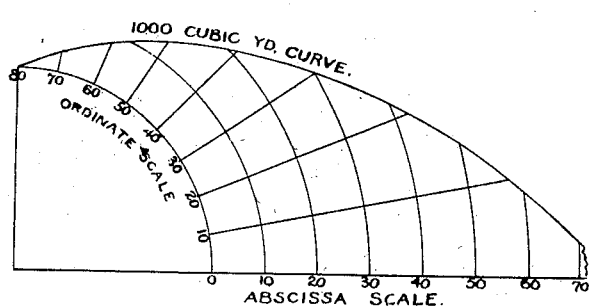
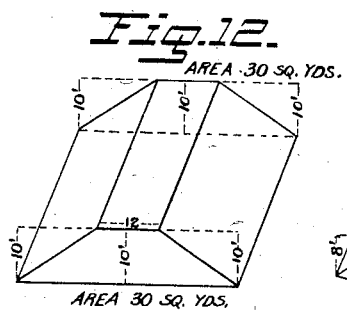
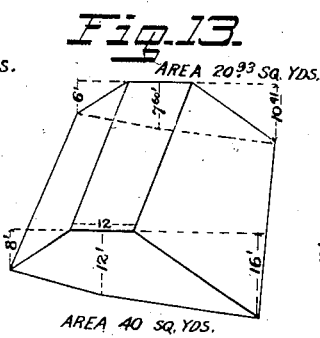
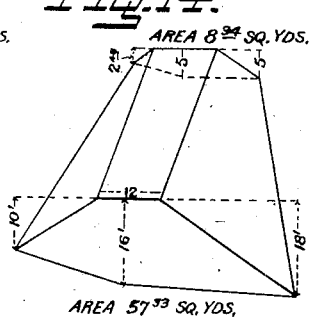
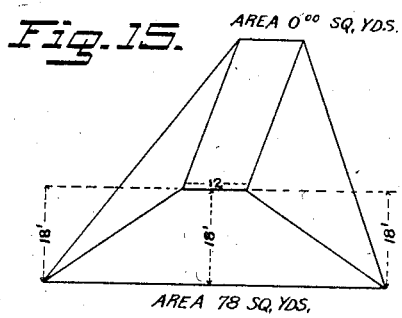

No. 748,566. Patented December 29, 1903.

UNITED STATES PATENT OFFICE.

HENRY NELSON PIERCE, OF NEW YORK, N. Y.

CALCULATING INSTRUMENT.

SPECIFICATION forming part of Letters Patent No. 748,566, dated December 29, 1903.

Application filed August 28, 1902. Serial No. 121,323. (No model.)

*To all whom it may concern:*

Be it known that I, HENRY NELSON PIERCE, a citizen of the United States, and a resident of the city of New York, borough of Manhattan, in the county and State of New York, have invented a new and Improved Calculating Instrument, of which the following is a full, clear, and exact description.

My invention relates to an engineering instrument of precision reading direct by a graphic method the cubic yards or cubic meters in station lengths of railway road-beds, canals, and levees from simple data found in engineers' field-notes of each cross-section— namely, the sum of the side heights and the center height.

Technically my invention relates to the determination of the volumes and functions of the volumes of such prismoidal solids having the full width of the road-bed throughout their length, and depends on the principle that any function of a prismoidal solid which can be expressed algebraically in terms of two variables may be represented by a plane curve on a chart, which curve is determined by using these two variables as its coördinates. By this method I obtain first the end areas of prismoidal lengths (usually every hundred feet or every twenty meters) by a simple reading of the instrument, and by a second stage, using the two end areas thus found of any length, I obtain by the same method the volume of said lengths, also by a simple reading of the instrument, avoiding by the use of my invention the long calculations formerly necessary to arrive at such result.

Reference is to be had to the accompanying drawings, forming a part of this specification, in which similar characters of reference indicate corresponding parts in all the figures.

Figure 1 is a plan view of the obverse side of a working chart and illustrates the manner of laying off abscissæ by means of an offset radial bar and sliding needle, showing also by means of the bar in dotted position the manner of laying off ordinates and, finally, the reading of the chart in square yards. Fig. 1ª is a plan view of the reverse side of the same chart, the manner of laying off ordinates, and the reading in cubic yards. Fig. 2 is an edge view of the chart shown in Fig. 1; and Fig. 3 is a detail section through the chart, showing the pivot-pin for the radial bar. Fig. 4 illustrates a thirty-square-yard curve as it would appear established by ordinary rectilinear and rectangular coördinates. Fig. 5 illustrates the same thirty-square-yard curve by the novel method used in establishing area curves upon my chart, which is by radial and circumferential coördinates. Figs. 6, 7, 8, and 9 represent random cross-sectional areas (twelve-feet base, one-and-one-half-feet : one-foot slopes) whose areas are determined by the thirty-square-yard curve, using their center height as abscissæ and sum of side heights as ordinate. Fig. 10 illustrates the one-thousand-cubic-yard curve as it would appear established by ordinary rectilinear and rectangular coördinates. Fig. 11 illustrates the same one-thousand-cubic-yard curve by the novel method used in establishing volume curves upon my chart, which is by radial and circumferential coördinates; and Figs. 12, 13, 14, and 15 illustrate random stations (one hundred feet long, twelve-feet base, one-and-one-half : one-foot slopes) whose volumes are determined by the one-thousand-cubic-yard curve, using one end area as abscissæ and the other end area as ordinate.

The chart A (shown in Fig. 1) is in the form of a sector and may be made of any suitable material. Said chart upon its arc is provided with a scale B, representing the sum of the side heights in feet, and at its lower straight edge with a scale C of center heights in feet, together with a number of curved lines D, computed to represent predetermined numbers of square yards, which curved lines D are read in conjunction with the aforesaid scales, and while upon the drawings the lines D read up to fifty square yards there are about one hundred and fifty determined curves D on an actual chart. Fig. 1ª illustrates the reverse side of the chart, which has scales B' and C' and curves D' similarly arranged, but to read cubic yards when the two end areas of a station are laid off on the two respective scales.

At the angle of the straight edges of the chart A a nut 10 is secured in the chart, as is shown in Fig. 3, and a conical pin 11 is screwed into said nut, serving as a pivot-support for an offset radial bar or arm 12, which bar or arm at its pivot end is attached to a preferably weighted plate 13, having an attached conical thimble 14 to fit over the pivot-pin 11. This bar or arm is adapted to swing over the surface of the chart A and is provided between its ends with a clamp-slide 15, carrying a pin 16, to be adjusted to the scale C, and at the outer end of the radial bar 12 a shoe 17 is secured, which carries a needle 18, shaped to point to the divisions of the scale B. When the pin or pointer 16 points to the division on the scale C representing a given center height, the arm or bar 12 is swung over the scale B until the needle 18 points to the division on the scale B representing a given sum of the side heights. The pointer 16 will then be at the curve D, indicating the number of square yards—twenty, for example, as shown in Fig. 1. The reverse side works similarly, indicating cubic yards per station when end areas are laid off on the two scales—seven hundred cubic yards, for example, as shown in Fig. 1ª.

It will be observed that the radial bar 12 can be operated at either side of the chart, as the pivot-pin 11 for the bar may be screwed into the nut 10 from either side, and that the radial bar 12 is capable of rotating in its inner and outer supports for the purpose of lifting the pointer 16 off the surface of the chart.

In the application of my invention to the determination of the cubic yards or cubic meters of station lengths the end areas or cross-sections can be expressed algebraically in terms of two variables—namely, the sum of the side heights and the center height, which information is to be found in the engineer's data or field-notes of each cross-section, where the usual three stakes are set.

The following equation will clearly illustrate the manner of determining the end areas: Let $f' + f'''$ equal sum of side heights in feet. Let $f''$ equal center height in feet. Let $r$ equal width of road-bed in feet. Let $s$ equal slope ratio. Then $$\text{end area} = \left(\frac{s}{2}f'' + \frac{r}{4}\right)(f' + f''') + \frac{r}{2}f''$$

or $$(f' + f''') = \frac{2\ \text{end area} - r f''}{s f'' + \frac{r}{2}}$$

It follows that if a curve be laid down or established upon a plane surface by using two such variables of any particular cross-sectional area as its coördinates such a curve at every point represents the area and is true for all possible variations of said two variables or coördinates, or, in other words, is true for all possible variations of form for equal end areas. For a graphic explication see Figs. 4 to 9, inclusive.

For instance, to plot a thirty-square-yard curve on either Fig. 4 or Fig. 5, where, as illustrated in Figs. 6, 7, 8, and 9, we have $r$ equals twelve feet, $s$ equals one and one-half, area equals thirty square yards, equal two hundred and seventy square feet, we simply substitute these values in the above equation, which then appears $$(f' + f''') = \frac{540 - 12 f''}{1\tfrac{1}{2} f'' + 6}$$

and by assuming successive arbitrary values for $f''$ in the second member of this last equation we obtain as many corresponding values for $f' + f'''$, and using these successively-assumed values of $f''$ as ordinates on the chart and laying off their corresponding values of $f' + f'''$ as abscissæ we obtain a succession of points on the chart, and drawing a line through all these points a thirty-square-yard curve is laid down upon the chart. The abscissa and ordinate scales are arbitrary, and a coarser or finer scale used in laying off the ordinates and abscissæ only makes the chart larger or smaller. Other square-yard curves are laid down similarly, and the chart is thus constructed.

Successively establishing similar curves upon the same plane surface at small intervals apart the one from the other and using as their respective coördinates the two variables that enter into the algebraic expression for cross-section areas successively larger or smaller a chart of determined curves is established upon the plane surface of the chart, each curve representing the area of equal cross-sections whose respective variables have been used as the coördinates to establish that curve.

My invention is then in a state for the finding of cross-section end areas, since any cross-section end area met with in practice is expressed in terms of its own two variables—namely, the sum of the two side heights and the center height as given by the engineer's data or field-notes at that particular cross section—and if these two variables are applied to the chart in the sense of two coördinates the end of the ordinate must fall upon one of the determined curves of the chart or proportionately in the small distance between two consecutive curves, and the area of such particular cross-section is directly read out, as is indicated in Figs. 4, 5, 6, 7, 8, and 9.

The process is repeated for all the cross-sections of the line to be constructed.

Considering the volume of a station's length, of which its two end areas have now been found by the application of my invention without mathematical calculation, the volume of said station is found in cubic yards or cubic meters by a second stage of the same process, for the volume of a station can also be expressed algebraically in terms of two variables—namely, of its two end areas already found—that is, a station's length whose volume is, for example, one hundred cubic yards or one hundred cubic meters may have its two end areas of every possible size—but these two variables will always relate to each other as determined by the algebraic expression above referred to. This will be seen from the following equation:

Let $r$ equal width of road-bed in feet. Let $l$ equal length of station in feet. Let $x$ equal one end area in square feet. Let $y$ equal opposite end area in square feet. Let $s$ equal slope ratio. Then $$\text{volume} = l\left[\frac{x+y}{3} + \sqrt{\frac{(4sx+r^2)(4sy+r^2)}{12s}} - r^2\right]$$

or $$y = \left(\frac{3\,\text{volume}}{l} + \frac{3r^2 - 4sx}{8s}\right) - \left(\sqrt{\frac{4sx+r^2}{8s}}\sqrt{\frac{48s\,\text{volume}}{l} + 9r^2 - 12sx}\right)$$

These two variables or end areas can therefore be used as coördinates to establish a curve upon another plane surface, and this curve at every point will represent the volume of said station's length (one hundred cubic yards or one hundred cubic meters) and be true for all possible variations in the size of the end areas. For a graphic explication of the above see Figs. 10, 11, 12, 13, 14, and 15. The volume equation for constructing the volume curves is handled in exactly the same manner as is the area equation. Similar curves are successively established upon this plane surface at small intervals apart the one from the other, using as their coördinates the end areas of successively larger and smaller volumes, and a chart of determined curves is established upon this plane surface, each curve representing a volume whose various possible end areas have been used as coördinates to establish that curve. My invention is then in a further state for the direct reading of cubic yards or cubic meters of a station's length similarly as the aforementioned end areas are read, since the volume of any station met with in practice is expressed in terms of its own two variables or end areas, and if the values of these two end areas in square units are applied to this chart in the sense of two coördinates the end of the ordinate must fall upon one of the determined curves of the chart or proportionately in the small distance between the two consecutive curves, and the volume of such particular station is readily read out, as is shown in the said Figs. 10 to 15, inclusive.

Briefly, my invention of a mechanical chart consists in the novel construction of the curves thereon, the arrangement of the scales thereon, and the means for determining the reading of the charts.

Materially my invention consists in any thin substance having two plane surfaces in the form of the sector of a circle, preferably a quadrant, upon one side of which are simultaneously established a chart of the above-mentioned area curves by coördinates and one circumferential scale for measuring ordinates and one straight radial scale for measuring abscissæ, all with their values in numerals and in any manner, as by printing, lithographing or engraving, and filling in with colored wax, while on the reverse side are simultaneously established a chart of the above-mentioned volume curves by coördinates and one circumferential scale for measuring ordinates and one straight radial scale for measuring abscissæ, all with their values in numerals in any manner, as mentioned with reference to the obverse side, the radial centers of both charts to be coincident save for the thickness of material.

Having thus described my invention, I claim as new and desire to secure by Letters Patent—

1. A calculating instrument consisting of a reversible chart in the form of a sector of a circle approximating a quadrant, on which are charted on the obverse side area curves by coördinates together with their respective ordinate and abscissa scales, all designated by numerals, while on the reverse side are chartered volume curves by coördinates together with their respective ordinate and abscissa scales, all designated by numerals, substantially as set forth.

2. A calculating instrument consisting of a reversible chart in the form of a sector of a circle approximating a quadrant, on which are chartered on the obverse side area curves by coördinates together with their respective ordinate and abscissa scales, all designated by numerals, while on the reverse side are chartered volume curves by coördinates together with their respective ordinate and abscissa scales all designated by numerals, and a radial calculating-bar having pointers disposed with respect to the scales and area and volume curves whereby to determine graphically without mathematical calculation, the volume of stations, of railway road-beds or levees from the sum of the side heights and center height of the end cross-section areas, substantially as described.

3. A calculating instrument consisting of a reversible chart in the form of a sector of a circle, on which are charted on the obverse side area curves by coördinates, together with their respective ordinate and abscissa scales, all designated by numerals, while on the reverse side are charted volume curves by coördinates together with their respective ordinate and abscissa scales, all designated by numerals, an offset radial bar swinging to the center of the sector and over the chart interchangeable from one side to the other at will, a running clamp-slide on the said bar between its ends, a shoe at the free end of the bar, and pointing or indicating needles one of which is attached to the clamp-slide, and the other to the shoe, substantially as set forth.

4. A calculating instrument consisting of a reversible chart in the form of a sector of a circle approximating a quadrant, on which are charted on the obverse side area curves by coördinate together with their respective ordinate and abscissa scales, all designated by numerals, while on the reverse side are charted volume curves by coördinates together with their respective ordinate and abscissa scales, all designated by numerals, an offset radial bar swinging to the center of the sector and over the chart interchangeable one side to the other at will, a running clamp-slide on the said bar between its ends, a shoe at the free end of the bar, pointing or indicating needles, one of which is attached to the clamp-slide and the other to the shoe, a reversible post constituting a pivot for the radial bar, a gyrating counterweighted support for the radial bar, and a thimble carried by the support to receive the said post, which post is located at the material radial center of the chart, substantially as set forth.

5. A sector-chart, an offset radial bar swinging about the center of the sector and over the chart on the obverse or reverse side at will, in combination with and carrying a running clamp-slide, a shoe at the outer end of said bar, pointing and indicating needles attached one to the running clamp-slide and the other to the shoe, an inner central carrying-support for the bar counterweighted to induce even wear, a thimble carried by said carrying-support, and a pivot-point reversibly attached to the chart to receive the said thimble, the attachment of the pivot-point being at the material radial center of the chart, substantially as set forth.

6. In a calculating instrument, having charts on the obverse and reverse sides thereof, an offset radial bar, offset, but always parallel to the radii of the charts on the obverse or reverse side of the instrument, an indicating-needle carried by the radial bar, said needle always being on a true radius of the chart, substantially as set forth.

7. In a calculating instrument, an offset radial bar revolving in its supports and raised from the surface of the chart, and a needle-point having fixed and adjustable connection with the radial bar, which needle-point, by reason of the offset and raised position of the radial bar is slightly lifted from the surface of the chart, when the bar is partially rotated and swung over the chart.

8. A calculating instrument having one of its faces marked to indicate cubic yards, the reverse face being marked to indicate square yards, and pivoted indicating means reversibly mounted whereby to be moved over either of said faces, substantially as set forth.

9. A calculating instrument having one of its faces marked with a series of curves designating cubic yards, the reverse side of said instrument having a series of curves designating square yards, and a reversible radial bar provided with an adjustable indicating-pointer adapted to be moved over the aforesaid faces.

10. A calculating instrument comprising a chart having marked thereon area curves by coördinates together with their respective ordinate and abscissa scales, all designated by numerals, and indicating means swingable over said chart in an arc, the line of which intersects said area curves.

11. A calculating instrument comprising a chart having thereon volume curves by coordinates together with their respective ordinate and abscissa scales, all designated by numerals, and indicating means adapted to move over said chart in a line which intersects the aforesaid curves, substantially as set forth.

12. A calculating instrument comprising a reversible chart in the form of a sector of a circle, the obverse and reverse sides thereof being relatively differentially charted with curved lines of measurement, and indicating means reversibly mounted to be movable over either of said relatively differentially charted faces.

13. A calculating instrument comprising a reversible chart in the form of a sector of a circle approximating the quadrant, the obverse and reverse sides thereof being relatively differentially charted with a graduated series of curved lines of measurement, and a reversible radial indicating-bar movable over the charted faces, substantially as set forth.

14. A calculating instrument having one of its faces marked with relatively differentially graduated curved lines of measurement, and indicating means movable over the charted surface on a line transverse of or intersecting the curves thereon, substantially as set forth.

In testimony whereof I have signed my name to this specification in the presence of two subscribing witnesses.

HENRY NELSON PIERCE.

Witnesses:
J. FRED. ACKER,
JNO. M. RITTER.